United States Patent Office 3,453,243
Patented July 1, 1969

3,453,243
PRIMING WITH POLYISOCYANATO-
ORGANOSILANES
Robert C. Hartlein, Midland, Mich., assignor to Dow
Corning Corporation, Midland, Mich., a corporation
of Michigan
No Drawing. Filed July 15, 1965, Ser. No. 472,331
Int. Cl. C08g 31/24, 31/26, 22/18
U.S. Cl. 260—77.5                    14 Claims

ABSTRACT OF THE DISCLOSURE

Polyisocyanatoorganosilanes have been found to be useful as internal or external primers to improve the adhesion of curable compositions, such as silicones, polyacrylates, polyurethanes and polysulfides, to substrates.

---

This invention relates to curable compositions containing polyisocyanatoorganosilanes as primers to improve the adhesion of the composition to a surface or substrate after the composition has been cured. This invention also relates to a method of priming a surface or substrate to improve the adhesion of cured compositions thereto.

Many materials have been and currently are being used to improve the adhesion of one material to another. Still the search goes on for better adhesion promoters, or primers, as these materials are called. It is an object of this invention to provide a method for improving the adhesion of curable compositions, such as silicone, polyacrylic, polyurethane and polysulfide compositions, to surfaces by priming the surface with certain new silanes prior to the application of the composition to the surface and curing it. It is another object to provide curable compositions of the kind specified above which have improved adhesion to surfaces because they contain the new silanes. Other objects and advantages of this invention will be obvious to those skilled in the arts from the following description and examples.

More specifically, this invention relates to a curable composition containing a silane having the formula

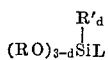

wherein

R is a hydrocarbon radical free of aliphatic unsaturation,
R' is a monovalent hydrocarbon radical free of aliphatic unsaturation,
L is a radical attached to the silicon atom via a silicon-carbon bond and which contains at least two isocyanato groups, and
$d$ has a value from 0 to 3, said silane being present in sufficient amount to improve the adhesion of said composition, when cured, to other surfaces.

The invention further relates to a method for improving the adhesion of a cured composition to a surface which method comprises applying to the surface a silane of the formula

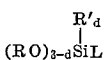

wherein

R is a hydrocarbon radical free of aliphatic unsaturation,
R' is a monovalent hydrocarbon radical free of aliphatic unsaturation,
L is a radical attached to the silicon atom via a silicon-carbon bond and which contains at least two isocyanato groups,
$d$ has a value from 0 to 3, and thereafter applying the composition to the surface in an uncured state and then curing the composition.

The curable compositions, as illustrated above, can vary widely in nature. Of primary interest at the present are those compositions such as the polyurethanes and polysulfides. While this invention is generally applicable to any curable composition regardless of the curing mechanism, it is particularly of use in the room temperature curing compositions.

The silanes which are useful in improving the adhesion of the curable compositions are those defined by the formula above. So far as is known at this time, the best primers are those silanes which contain three hydrolyzable groups, that is, silanes of the formula $(RO)_3SiL$.

In the above formulae, R and R' can be any hydrocarbon radical free of aliphatic unsaturation. Thus, by way of illustration, R and R' can be alkyl, cycloalkyl, aryl, aralkyl or alkaryl radicals such as the methyl, ethyl, propyl, isopropyl, butyl, amyl, hexyl, octyl, dodecyl, octadecyl, myricyl, cyclopentyl, cyclohexyl, phenyl, xenyl, naphthyl, benzyl, phenylethyl, phenylpropyl, tolyl, xylyl, mesityl and ethylphenyl radicals. Preferably R is an alkyl radical containing from 1 to 3 carbon atoms and R' is preferably a hydrocarbon radical containing from 1 to 6 carbon atoms.

The radical L is attached to the silicon atom by means of a silicon-carbon (Si—C) bond and contains at least two isocyanato (NCO) groups. Aside from these essential characteristics the L radical can contain any other groups or linkages which are unreactive towards the isocyanato groups and which do not have an adverse effect on the overall stability of the silane. By way of example, this radical can contain ether, ester, thioether and thioester linkages or halogen atoms. Specific examples of the L radical are set forth in the examples below.

The silanes employed herein are new compounds which can be prepared by the methods described in the application of Robert L. McKellar entitled, "Polyisocyanato Silanes and Siloxanes," filed simultaneously herewith on July 15, 1965, and bearing Ser. No. 472,317, the disclosure of this application being incorporated herein by reference.

When the silanes are to be used as internal primers, they are mixed into the curable composition at some point during its preparation. Preferably this is done as the last step of the preparation and under anhydrous conditions to prevent the premature hydrolysis of the silane. The finished composition can then be packaged in moisture impervious containers according to the practices now prevalent. It should be pointed out, however, that the silane can be mixed into the curable composition at most any point of its preparation so long as it is not exposed to adverse reactants or moisture. The amounts of silane added to the composition to improve its adhesion can be as little as about 0.1% and can range up to about 5% or more. Generally speaking, for best results, the amount added will be in the range of 0.25 to 1%. Amounts greater than 1% will only be used in special instances primarily because of economic factors. All the percents specified are by weight and based on the total weight of the composition.

In accordance with the method of this invention, the silanes can also be used as external primers. The adhesion of curable compositions to various surfaces can be improved if the surface is first treated with one or more of the above silanes. The method of application is not critical so far as is known but is generally and preferably done from a solution of the silane in a suitable solvent such as a ketone, ether, ester, a hydrocarbon or a combination of solvents. Specific examples of such solvents include acetone, methylisobutylketone, cyclohexanone, diethylether, the alkyl and aryl monoethers of ethylene glycol, propylene glycol and various polyols; ethyl acetate, toluene, benzene, xylene, hexane and cyclohexane. Of course, no solvent which would react with the isocyanato groups should be employed. The silane can be applied, for example, by spraying, brushing, rubbing or dabbing it onto the surface, or in some instances it may be feasible to dip the surface to be treated into the silane. If the solvent is one which will not inhibit the cure of the composition to be adhered to the surface, the composition may be applied to the treated surface at any time. However, it is preferable to allow the treated surface to dry, i.e. let the solvent evaporate, before applying the curable composition thereto. After the composition is applied to the primed surface, it is cured by heating, exposing it to radiation, or just allowing it to stand in the case of room temperature curing compositions. The particular curing mechanism of the composition determines what treatment is necessary, if any, to cure the composition.

As those skilled in the art know, it is almost impossible to get anything to adhere to a dirty surface. Therefore, the surface should be clean before the silane or the composition containing it is applied. The cleaning technique and materials to be used, when needed, are well known in the art and vary from a simple wiping with a solvent to scouring with an abrasive cleanser, sonic cleaning, and sand blasting, depending of course on the nature of the surface to be treated. As the skilled artisan knows, care must be taken in the selection of the cleansing agent employed because some of them are notorious for leaving a release film behind.

The method and compositions of this invention provide improved adhesion to a wide variety of surfaces. For example, the surface can be siliceous such as brick, concrete, glass, ceramic or porcelain; metallic such as aluminum, tin, iron, magnesium, copper or steel; cellulosic such as wood or paper; a plastic such as the polystyrenes, the polyacrylates, the alkyds, the formaldehydes (phenol, urea or melamine) or cellulose acetate. Best results are obtained with siliceous and cellulosic surfaces, particularly the siliceous surfaces.

In order that those skilled in the art may better understand how the present invention can be practiced, the following examples are given by way of illustration and not by way of limitation.

Example 1

The silane

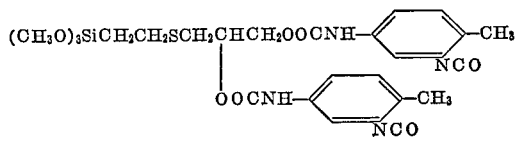

angle of 180° to each other. The force required to separate the two pieces of glass is the measure of the adhesion of the composition and is reported in pounds per square inch.

In some tests the silane was used as an external primer only. When this was done, a 1% by weight solution of the silane in a dry 50-50% by weight mixture of toluene and methylisobutyl ketone was employed. This solution was wiped on each of the pieces of glass and then the surfaces allowed to dry for about 30 minutes before the sealant was applied and the two pieces joined. In other tests, varying amounts of the silane were added to the sealant composition in which case it functioned as an internal primer. In still other tests, the silane was used both as an internal and external primer, and finally, in some tests no primer was used at all as a control.

After the two pieces of glass were joined by the sealant the test specimen was kept at 25° C. and 50% relative humidity and allowed to cure, the strength of the bond being checked using the lap shear test at 24 hours, 48 hours, 72 hours and 7 days after the specimen was prepared. The results of this test are reported as adhesion in pounds per square inch (p.s.i.) in the table below. The hydrolytic stability of the bond between the sealant and the glass was also checked and is reported as the "7 days—Water" results in the table below. For this test, some of the specimens that had cured for 24 hours at 25° C. and 50% relative humidity, were placed under water for 72 hours at 25° C. and then allowed to stand another 72 hours in air at 70° C. before checking the bond strength. In the table below the results of these tests are set forth and, when the silane was used as an internal primer, the weight percent of the silane employed is also set forth.

ADHESION IN LAP SHEAR TEST IN P.S.I.

| Time | No primer (control) | External primer | Internal primer | | | Internal and external, 0.28% |
|---|---|---|---|---|---|---|
| | | | 0.2% | 0.28% | 0.35% | |
| 24 hrs | 60 | 164 | 112 | 176 | 140 | 192 |
| 48 hrs | 60 | 140 | -------- | 220 | 352 | 400 |
| 72 hrs | 68 | 180 | -------- | 316 | 340 | 468 |
| 7 days | 56 | 216 | 360 | 460 | 508 | 476 |
| 7 days, water | 0 | 520 | 440 | 356 | 452 | 364 |

Example 2

A 1% by weight solution of the silane

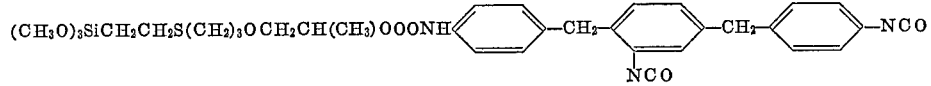

was employed as both an internal and external primer to improve the adhesion of a room temperature curing polyurethane sealant composition. The effectiveness of the primer was tested employing the lap shear test on glass. In this test, two pieces of glass about one inch wide are employed. The curable composition is applied to one of the pieces and then the other piece placed on top of that so its tail is pointing in the opposite direction. The area of each surface that is in contact with the curable composition is about ¼" x 1" and the thickness of the composition between the two pieces of glass is about ¼". After the composition has been cured, the two ends of test specimen are clamped in the test machine and pulled at an in a dry 50-50% by weight mixture of toluene and methylisobutyl ketone was wiped on the surfaces of glass, aluminum and stainless steel panels and then the panels allowed to air dry for about 30 minutes. Strips of a room temperature curing elastomeric polyurethane composition were spread on the primed surfaces and allowed to cure. The adhesion of the cured composition to the primed surface was compared to its adhesion to identical but unprimed surfaces by pulling the strips of cured material, by hand, away from the surface. In all cases the adhesion of the cured composition to the primed surface was significantly better than its adhesion to the corresponding unprimed surface.

Example 3
When the silanes below are substituted for the silanes in the previous examples, similar results are obtained.
(1)
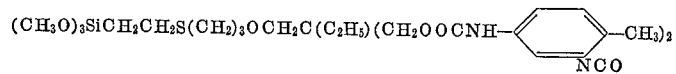
(2)
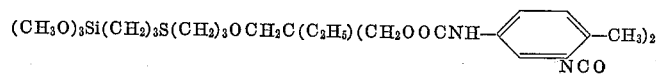
(3)
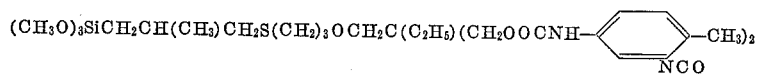
(4)
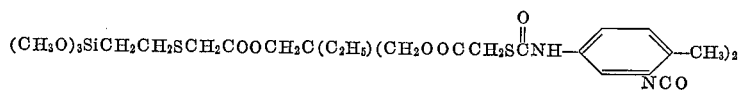
(5)
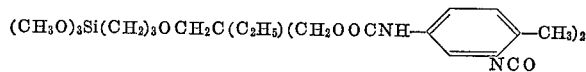
(6)
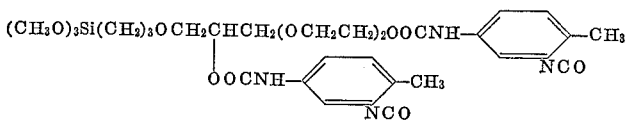
(7)
$(C_2H_5O)_2(C_2H_5)Si(CH_2)_3C(C_2H_5)[CH_2OOCNH(CH_2)_6NCO]_2$
(8)
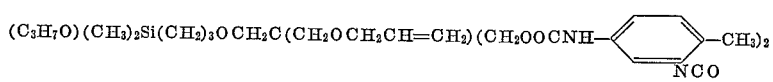
(9)
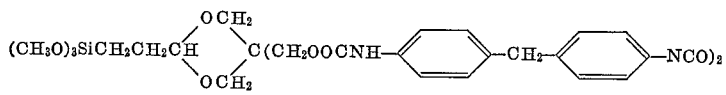
(10)
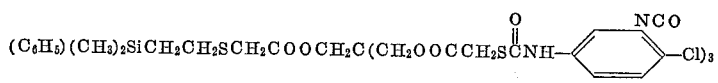
(11)
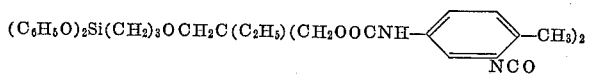
(12)
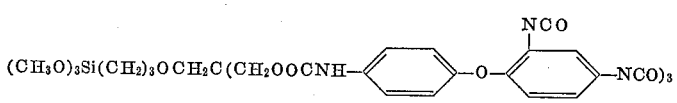
(13)
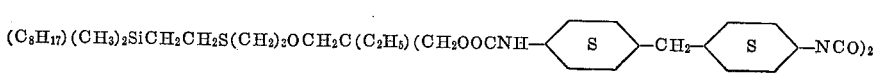
(14)
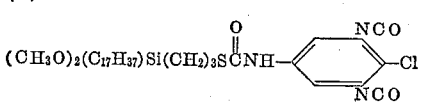
(15)
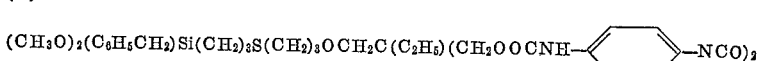
That which is claimed is:
1. In a curable composition selected from the group consisting of silicone, polyacrylic, polyurethane and polysulfide compositions containing a primer in an amount sufficient to improve the adhesion of said composition, when cured, to other surfaces, the improvement which comprises employing as a primer at least about 0.1% by weight based on the total weight of the composition of a silane having the formula

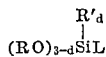

wherein
R is a hydrocarbon radical free of aliphatic unsaturation,
R' is amonovalent hydrocarbon radical free of aliphatic unsaturation,
L is a radical attached to the silicone atom via a silicon-carbon bond which contains at least two isocyanato groups, and
$d$ has a value of from 0 to 3.

2. The composition of claim 27 wherein R is an alkyl radical containing from 1 to 3 carbon atoms and $d$ is 0.

3. The composition of claim 2 wherein the curable composition is a polyurethane.

4. The composition of claim 3 wherein the silane is

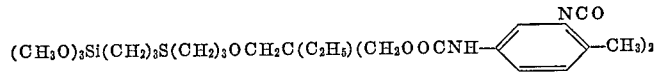

5. The composition of claim 3 wherein the silane is

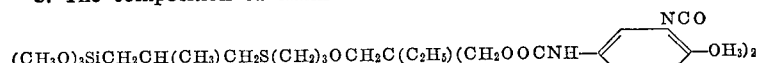

6. The composition of claim 3 wherein the silane is

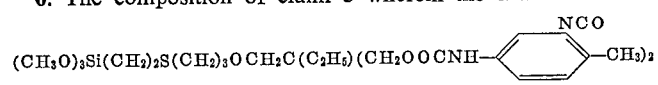

7. The composition of claim 3 wherein the silane is

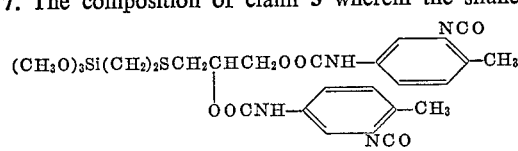

8. The composition of claim 3 wherein the silane is

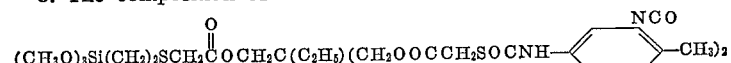

9. The composition of claim 3 wherein the silane is

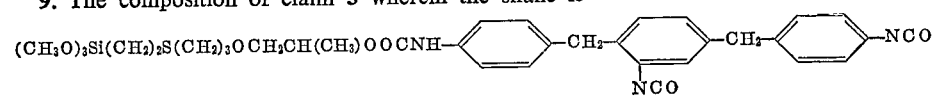

10. The composition of claim 3 wherein the silane is

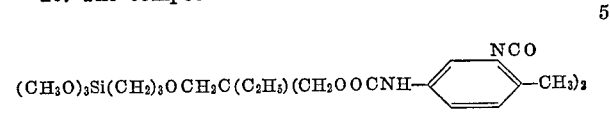

11. The composition of claim 3 wherein the silane is

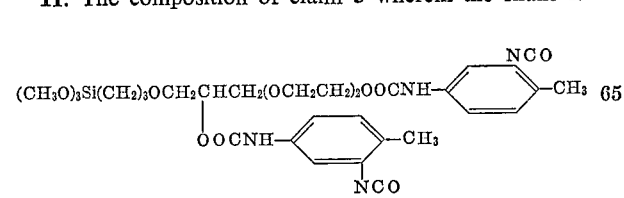

12. In a method of adhering a cured composition selected from the group consisting of silicone, polyacrylic, polyurethane and polysulfide compositions, to a surface which method comprises applying the composition to the surface in an uncured state and then curing it, the improvement which comprises employing, as a primer, a silane of the formula

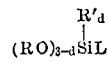

wherein
R is a hydrocarbon radical free of aliphatic unsaturation,
R' is a monovalent hydrocarbon radical free of aliphatic unsaturation,
L is a radical attached to the silicon atom via a silicon-carbon bond and which contains at least two isocyanato groups, and
$d$ has a value from 0 to 3,
whereby the adhesion of the cured composition to the surface is improved.

13. The method of claim 12 wherein the silane has the formula $(RO)_3SiL$.

14. The method of claim 13 wherein the composition is a polyurethane.

References Cited

UNITED STATES PATENTS

| | | | |
|---|---|---|---|
| 2,532,559 | 12/1950 | Klein | 117—123 |
| 2,835,692 | 5/1958 | Bloom et al. | 260—453 |
| 3,178,391 | 4/1965 | Holtschmidt et al. | 260—46.5 |
| 3,243,475 | 3/1966 | Reischl et al. | 260—824 |
| 3,269,982 | 8/1966 | Meals | 260—46.5 |
| 3,297,473 | 1/1967 | Bulbenko | 117—72 |
| 3,309,261 | 3/1967 | Schiller et al. | 161—190 |
| 3,312,669 | 4/1967 | Giordano | 260—79.1 |
| 3,355,473 | 11/1967 | Clark et al. | 260—448.2 |

FOREIGN PATENTS

| | | |
|---|---|---|
| 920,517 | 3/1963 | Great Britain. |
| 923,583 | 4/1963 | Great Britain. |

DONALD E. CZAJA, *Primary Examiner.*

M. J. WELSH, *Assistant Examiner.*

U.S. Cl. X.R.

117—72; 161—192; 260—79.1, 448.2